United States Patent
Kojima

(10) Patent No.: US 8,261,791 B2
(45) Date of Patent: Sep. 11, 2012

(54) PNEUMATIC TIRE

(75) Inventor: Hiroyuki Kojima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1216 days.

(21) Appl. No.: 12/048,750

(22) Filed: Mar. 14, 2008

(65) Prior Publication Data

US 2008/0236714 A1     Oct. 2, 2008

(30) Foreign Application Priority Data

Mar. 30, 2007  (JP) ................. 2007-092187

(51) Int. Cl.
*B60C 11/03* (2006.01)
(52) U.S. Cl. ............. 152/209.8; 152/209.9; 152/209.22; 152/209.27
(58) Field of Classification Search .............. 152/209.8, 152/209.9, 209.22, 209.27
See application file for complete search history.

(56) References Cited

U.S. PATENT DOCUMENTS

| | | | | |
|---|---|---|---|---|
| 5,042,546 | A | * | 8/1991 | Forney et al. ........... 152/454 |
| 5,733,393 | A | * | 3/1998 | Hubbell et al. .......... 152/209.22 |
| 6,095,215 | A | * | 8/2000 | Hutson et al. ........... 152/209.22 |
| 2007/0012389 | A1 | * | 1/2007 | Ito ..................... 152/209.22 |

FOREIGN PATENT DOCUMENTS

| | | | |
|---|---|---|---|
| JP | 04-208607 A | * | 7/1992 |
| JP | A 2005-53311 | | 3/2005 |
| JP | A 2006-143040 | | 6/2006 |
| JP | 2006-232012 A | * | 9/2006 |

OTHER PUBLICATIONS

Machine translation for Japan 2006-232012 (no date).*

* cited by examiner

*Primary Examiner* — Steven D Maki
(74) *Attorney, Agent, or Firm* — Greer, Burns & Crain, Ltd.

(57) ABSTRACT

Provided is a low profile pneumatic tire for an SUV, which is capable of having its enhanced rut performance with its dry and wet performances being reconciled with each other. The pneumatic tire according to the present invention has a nominal width of not less than 255, an outside diameter of not less than 720 mm, and an aspect ratio of not more than 55%. The pneumatic tire has a designated direction of sides thereof for mounting the tire on a vehicle. In its tread portion, the pneumatic tire includes five main grooves extending in the tire's circumferential direction, and six land portions defined by the five main grooves. Each of the shoulder land portions located outermost in the tire's width direction is divided into a narrow rib portion with a width of not less than 10 mm but not more than 15 mm on a side closer to its neighboring main groove and a block portion on a side closer to a corresponding one of the shoulders by a narrow groove which extends in the tire's circumferential direction, and which has a depth less than 50% of that of its neighboring main grooves. The remaining four land portions interposed between the shoulder land portions each have a depth of not less than 20 mm but not more than 26 mm.

9 Claims, 2 Drawing Sheets

IN    OUT

PNEUMATIC TIRE

BACKGROUND OF THE INVENTION

The present invention relates to a low profile tire for an SUV (sport utility vehicle). Specifically, the present invention relates to a pneumatic tire capable of having its enhanced rut performance with its dry and wet performances being reconciled with each other.

An example of a pneumatic tire for an SUV is a pneumatic tire with a nominal width of not less than 255 mm, an outside diameter of not less than 720 mm and an aspect ratio of not more than 55%. The pneumatic tire has a designated direction of sides thereof for mounting the tire on a vehicle. A general design of the pneumatic tire of this kind is its tread section including four main grooves extending in the tire's circumferential direction with five land portions being defined by these four main grooves (see Patent Documents 1 and 2, for example).

Nevertheless, the low profile tire with such a large nominal width and outside diameter generates a large camber thrust, and accordingly has a disadvantage that its driving performance (hereinafter referred to as "rut performance") is bad in road surfaces affected by wheel ruts. With this taken into consideration, increase in a groove component of the tire's tread section makes it possible to improve the tire's rut performance and additionally enhance its wet performance. In the case where the groove component is increased in the tread section, however, this increase reduces the dry performance of the tire. As a result, it is difficult to satisfy the dry performance, the wet performance and the rut performance simultaneously.

Patent Document 1: Japanese patent application Kokai publication No. 2005-53311
Patent Document 2: Japanese patent application Kokai publication No. 2006-143040

SUMMARY OF THE INVENTION

An object of the present invention is to provide a low profile pneumatic tire for an SUV, which is capable of having its enhanced rut performance with its dry and wet performances being reconciled with each other.

A pneumatic tire according to the present invention made for the purpose of achieving the foregoing object is a pneumatic tire with a nominal width of not less than 255 mm, an outside diameter of not less than 720 mm, and an aspect ratio of not more than 55%, and having a designated direction of sides thereof for mounting the tire on a vehicle. In its tread section, the pneumatic tire includes: five main grooves each extending in the tire's circumferential direction; and six land portions defined by the five main grooves. Each of the shoulder land portions located outermost in the tire's width direction is divided into a narrow rib portion with a width of not less than 10 mm but not more than 15 mm on a side closer to its neighboring main groove and a block portion on a side closer to a corresponding one of the shoulders by a narrow groove which extends in the tire's circumferential direction, and which has a depth less than 50% of that of its neighboring main groove. The remaining four land portions interposed between the shoulder land portions each have a width of not less than 20 mm but not more than 26 mm.

The present invention causes the low profile tire with a larger nominal width and a larger outside diameter to have a larger number of main grooves, and thus narrows down the land portions defined by these main grooves. Thereby, the present invention makes it possible to enhance the rut performance of the low profile tire, and further to improve the wet performance thereof. Moreover, the present invention makes it possible to secure the dry performance for the low profile tire, because the present invention divides each of the shoulder land portions of the low profile tire into a narrow rib portion on a side closer to its neighboring main groove and a block portion on a side closer to a corresponding one of the shoulders, and concurrently because the present invention leaves the narrow rib portion, which extends in the tire's circumferential direction without interruption, at least in one of the shoulder land portions which is closer to the outside of the vehicle. In sum, the present invention makes it possible to cause the pneumatic tire for an SUV to have its enhance rut performance with its dry and wet performances being reconciled with each other.

It is desirable that, out of four land portions, a land portion located closest to the outside of the vehicle should include a plurality of lateral grooves being open to any one of its two neighboring main grooves but not crossing the land portion, and that each of some lateral grooves open to one of its two neighboring main grooves which is closer to the center of the vehicle should have a depth of 60% to 90% of that of the main groove closer to the center of the vehicle, as well as that each of the other lateral grooves open to the other of its two neighboring main grooves which is closer to the outside of the vehicle have a depth of 10% to 30% of that of the main groove closer to the outside of the vehicle. The foregoing configuration given to the land portion located closest to the outside of the vehicle is effective for the rut and dry performances to be reconciled with each other.

It is desirable that, out of the four land portions, a land portion located closest to the center of the vehicle should include a plurality of arc-shaped grooves each extending in an arc shape to open to the neighboring main groove which is closer to the center of the vehicle but not crossing the land portion, and that each of the arc-shaped grooves should become deeper toward the center of the vehicle, as well as that the arc-shaped grooves should be arranged in order that the arc-shaped grooves should be connected one to another. The foregoing configuration given to the land portion located closest to the center of the vehicle is effective for the rut and wet performances to be reconciled with each other.

It is desirable that, out of the four land portions, a land portion second closest to the outside of the vehicle should include a plurality of arc-shaped grooves each extending in an arc shape to open to the neighboring main groove which is closer to the center of the vehicle but not crossing the land portion, and a plurality of lateral grooves being open to the neighboring main groove which is closer to the outside of the vehicle but not crossing the land portion. In this case, it is desirable that each of the arc-shaped grooves should become deeper toward the center of the vehicle, and that the arc-shaped grooves should be arranged in order that the arc-shaped grooves should be connected one to another, as well as that each of the lateral grooves open to the main groove that is closer to the outside of the vehicle should have a depth of 10% to 30% of that of the main groove closer to the outside of the vehicle. Furthermore, it is desirable that, out of the four land portions, a land portion second closest to the center of the vehicle should include a plurality of lateral grooves which cross the land portion, and that each of the lateral grooves should become deeper toward the center of the vehicle. Moreover, it is desirable that a main groove interposed between the land portion second closest to the outside of the vehicle and the land portion second closest to the center of the vehicle out of the four land portions should be narrower than the rest of the main grooves and is less than 7 mm in width. The foregoing configurations given respectively to the land portion second closest to the outside of the vehicle and the land portion second closest to the center of the vehicle are effective for the rut, dry and wet performances to be harmonized with one another.

It is desirable that the narrow rib portion in the shoulder land portion which is closer to the outside of the vehicle should include a plurality of lateral grooves which cross the narrow rib portion, and that the lateral grooves each have a depth of 10% to 30% of the main groove. This case is effective for the rut and dry performances to be reconciled with each other.

It is desirable that the narrow rib portion in the shoulder land portion which is closer to the center of the vehicle should includes, in an alternate manner, a plurality of lateral grooves which cross the narrow rib portion and a plurality of lateral grooves being open to any one of its two neighboring main grooves but not crossing the narrow rib portion, and that each of the lateral grooves which cross the narrow rib portion have a depth of 60% to 90% of that of the main groove. This case is effective for the rut and wet performances to be reconciled with each other.

It is desirable that the ratio of the footprint length to the footprint width of the tread portion should be set at 0.4 to 0.6. This case is effective for the rut, dry and wet performances to be harmonized with one another.

The nominal width referred to in the present invention is the nominal width specified in standards (JATMA, ETRTO and TRA) in accordance with which tires are manufactured. The footprint width and length of the tread portion referred to in the present invention are dimensions in the tire's width and circumferential directions of a footprint which is obtained when the tread portion of the tire is pressed against a flat surface with a condition that workload should be 60% of the maximum load carrying ability of the tire.

In the case of the present invention, the main grooves are those with a width of 3 mm to 15 mm and with a depth of 5 mm to 12 mm. The narrow groove is that with a width of 0.5 mm to 2 mm and with a depth of 1 mm to 5 mm. No specific restrictions are imposed on the groove width or groove depth of each of the lateral grooves and the arc-shaped grooves. It should be noted that the groove width means the depth of a groove in the tread surface, and that the groove depth means the maximum depth of a groove from the tread surface.

DETAILED DESCRIPTION OF THE PREFERRED EMBODIMENTS

Detailed descriptions will be provided hereinbelow for a configuration according to the present invention with reference to the accompanying drawings.

Figure 1:
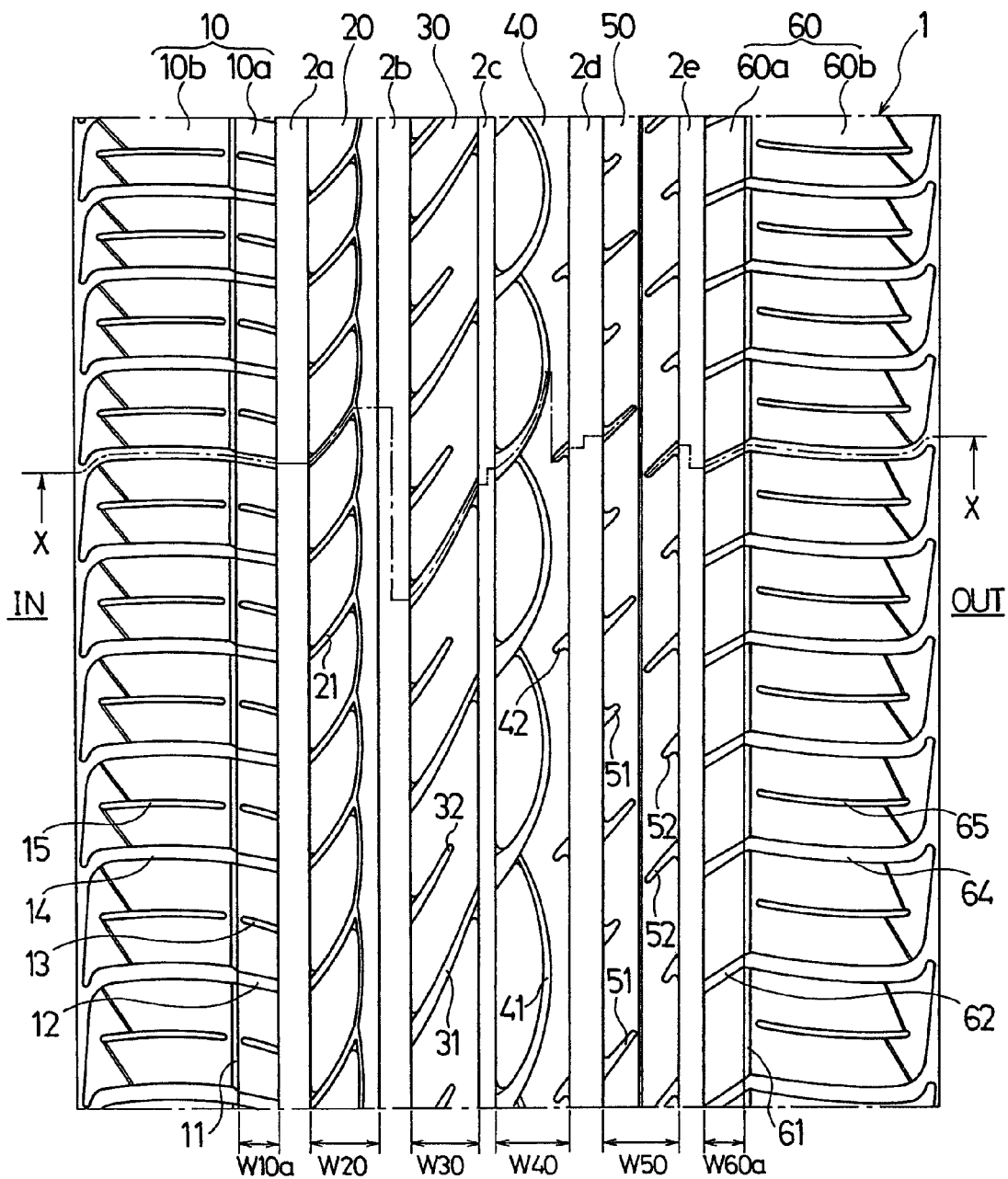
FIG. 1 is a development showing a tread pattern of a pneumatic tire according to an embodiment of the present invention.
Figure 2:
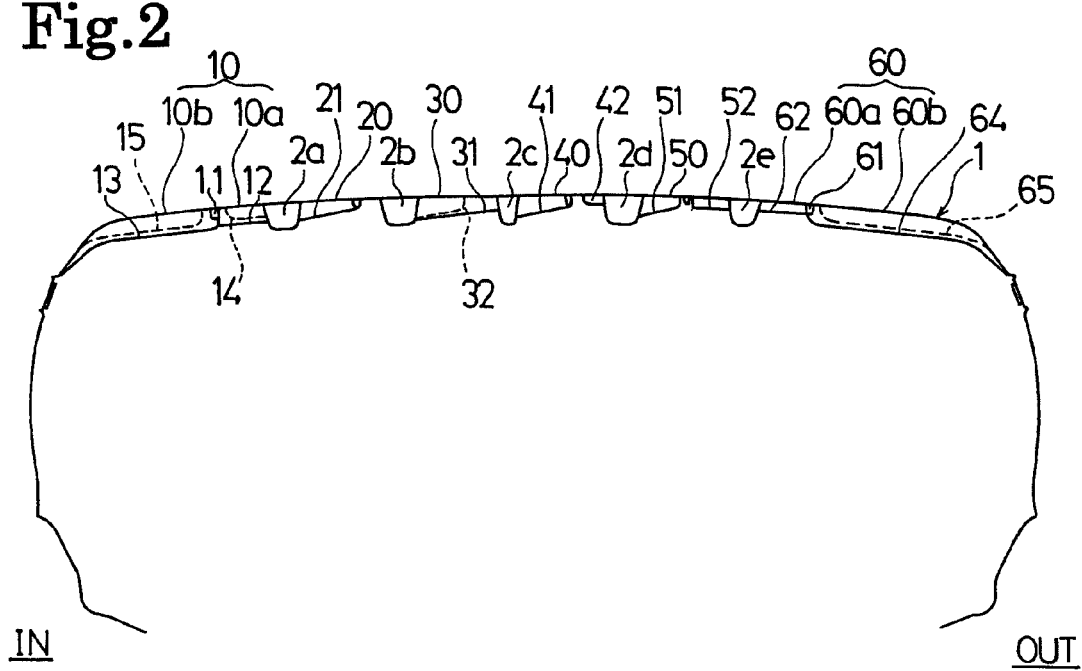
FIG. 2 is a cross-sectional view of the tread pattern taken along the line indicated by arrows in FIG. 1.

FIG. 1 is a development showing a tread pattern of a pneumatic tire according to an embodiment of the present invention. FIG. 2 is a cross-sectional view of the tread pattern taken along the line indicated by arrows in FIG. 1. The pneumatic tire according to the present embodiment has a nominal width of not less than 255 mm, desirably 255 mm to 295 mm. In addition, the pneumatic tire has an outside diameter of not less than 720 mm, desirably 720 mm to 760 mm. The pneumatic tire has an aspect ratio of not more than 55%, desirably 35% to 55%. The pneumatic tire has a designated direction of sides thereof for mounting the tire on a vehicle. Nevertheless, the pneumatic tire has a tread design without a designated direction of rotation of the tire. In FIG. 1, reference symbol IN denotes a side closer to the center of a vehicle; and OUT, a side closer to the outside of the vehicle.

As shown in FIG. 1, five main grooves 2a to 2e which extend straight in the tire's circumferential direction are formed in a tread portion 1. From the side closer to the center of the vehicle to the side closer to the outside of the vehicle, 6 land portions 10, 20, 30, 40, 50 and 60 are defined by these main grooves 2a to 2e. Specifically, four land portions 20, 30, 40 and 50 respectively with widths W20, W30, W40 and W50 are arranged between shoulder land portions 10 and 60 located outermost in the tire's width direction. The widths W20, W30, W40 and W50 are not less than 20 mm, but not more than 26 mm.

It is possible to enhance the rut performance of a low profile tire with such a large nominal width and outside diameter, and further to improve the wet performance thereof, by causing the low profile tire to have more of main grooves 2a to 2e, and thus by narrowing down the widths W20 to W50 of the respective land portions 20 to 50 defined by these main grooves 2a to 2e. In this respect, when the widths W20 to W50 of the respective land portions 20 to 50 are less than 20 mm, the dry performance of the tire decreases. On the other hand, when the widths W20 to W50 thereof exceed 26 mm, the rut and wet performances of the tire become insufficient.

The shoulder land portion 10 closer to the center of the vehicle is divided into a narrow rib portion 10a with a width of W10a of not less than 10 mm but not more than 15 mm on a side closer to its neighboring main groove 2a and a block portion 10b on a side closer to the shoulder by a narrow groove 11 which extends in the tire's circumferential direction, and which has a depth of less than 50% of its neighboring groove 2a. It is possible to secure the dry performance for the low profile tire, because the shoulder land portion 10 is divided into the narrow rib portion 10a on the side closer to its neighboring main groove and the block portion 10b on the side closer to the shoulder, and concurrently because the narrow rib portion 10a extending in the tire's circumferential direction without interruption is left in the shoulder land portion 10. In this respect, when the depth of the narrow groove 11 is not less than 50% of its neighboring main groove 2a, this depth decreases the dry performance. In addition, when the width W10a of the narrow rib portion 10a is less than 10 mm, this width decreases the dry performance. On the other hand, when the width W10a exceeds 15 mm, this width decreases the rut performance.

The narrow rib portion 10a includes, in an alternate manner, multiple lateral grooves 12 which cross the narrow rib portion 10a, and multiple lateral grooves 13 which do not cross the narrow rib portion 10a with each of the lateral grooves 13 being open to the main groove 2a. The depth of each of these lateral grooves 12 is set at 60% to 90% of that of the main groove 2a. In this respect, when the depth of each of the lateral grooves 12 is less than 60% of that of the main groove 2a, this depth decreases the wet and rut performances. On the other hand, when the depth of each of the lateral grooves 12 exceeds 90% of that of the main groove 2a, this depth decreases the dry performance. In addition, the block portion 10b includes multiple lateral grooves 14 which cross the block portion 10b with each of the lateral grooves 14 connecting with the respective lateral grooves 12, and multiple lateral grooves 15 which do not cross the block portion 10b. These lateral grooves 14 are formed deeper than the lateral grooves 12 are formed.

The shoulder land portion 60 on the side closer to the outside of the vehicle is divided into a narrow rib portion 60a with a width W60a of not less than 10 mm but not more than 15 mm on a side closer to its neighboring main groove 2e and a block portion 60b on a side closer to the shoulder by a narrow groove 61 which extends in the tire's circumferential direction, and which has a depth of less than 50% of its neighboring main groove 2e. It is possible to secure the dry performance for the low profile tire, because the shoulder land portion 60 is divided into the narrow rib portion 60a on the side closer to its neighboring main groove and the block portion 60b on the side closer to the shoulder, and concurrently because the narrow rib portion 60b extending in the tire's circumferential direction without interruption is left in the shoulder land portion 60. In this respect, when the depth of the narrow groove 61 is not less than 50% of that of the main groove 2e, this depth decreases the dry performance. When the width W60a of the narrow rib portion 60a is less than 10 mm, this width decreases the dry performance. On the other hand, when the width W60a exceeds 15 mm, this width decreases the rut performance.

The narrow rib portion 60a includes multiple lateral grooves 62 which cross the narrow rib portion 60a. The depth of each of these lateral grooves 62 is set at 10% to 30% of that of the main groove 2e. In this respect, when the depth of each of the lateral grooves 62 is less than 10% of that of the main groove 2e, this depth decreases the wet and rut performances. On the other hand, when the depth of each of the lateral grooves 62 exceeds 30% of that of the main groove 2e, this depth decreases the dry performance. In addition, the block portion 60b includes, in an alternate manner, multiple lateral grooves 64 which cross the block portion 60b with each of the lateral grooves 64 connected with the respective lateral grooves 62, and multiple lateral grooves 65 which do not cross the block portion 60b. These lateral grooves 64 are formed deeper than the lateral grooves 62 are formed.

Out of the four land portions 20 to 50, the land portion 50 located closest to the outside of the vehicle includes multiple lateral grooves 51 which do not cross the land portion 50 with each of the lateral grooves 51 being open to the main groove 2d and multiple lateral grooves 52 which do not cross the land portion 50 with each of the lateral grooves 52 being open to the main groove 2e. The depth of each of the lateral grooves 51 open to the main groove 2d on the side closer to the center of the vehicle is set at 60% to 90% of that of the main groove 2d. The depth of each of the lateral grooves 52 open to the main groove 2e on the side closer to the outside of the vehicle is set at 10% to 30% of that of the main groove 2e. In this respect, when the depth of each of the lateral grooves 51 open to the main groove 2d on the side closer to the center of the vehicle is less than 60%, this depth decreases the rut performance. On the other hand, when the depth of each of the lateral grooves 51 exceeds 90% of that of the main groove 2d, this depth decreases the dry performance. In addition, when the depth of each of the lateral grooves 52 open to the main groove 2e on the side closer to the outside of the vehicle is less than 10% of that of the main groove 2e, this depth decreases the rut performance. On the other hand, when the depth of each of the lateral grooves 52 exceeds 30% of that of the main groove 2e, this depth decreases the dry performance.

Out of the land portions 20 to 50, the land portion 20 located closest to the center of the vehicle includes multiple arc-shaped grooves 21 which extend in an arc instead of crossing the land portion 20 with each of the arc-shaped grooves 21 being open to the main groove 2a closer to the center of the vehicle. The arc-shaped grooves 21 are each designed to become deeper toward the center of the vehicle. In addition, the arc-shaped grooves 21 are connected one to another. The depth of each of the arc-shaped grooves 21 is set at 30% to 80% of that of the main groove 2a. It is possible to enhance the rut performance because the arc-shaped grooves 21 are each designed to become deeper toward the center of the vehicle. In addition, it is possible to secure the aggregate area of the arc-shaped grooves 21, and thus to improve the wet performance, because the arc-shaped grooves 21 are connected one to another.

Out of the four land portions 20 to 50, the land portion 40 located second closest to the outside of the vehicle includes multiple arc-shaped grooves 41 which extend in an arc instead of crossing the land portion 40 with each of the arc-shaped grooves 41 being open to the main groove 2c closer to the center of the vehicle, and multiple lateral grooves 42 which do not cross the land portion 40 with each of the lateral grooves 42 being open to the main groove 2d on the side closer to the outside of the vehicle. The arc-shaped grooves 41 are each designed to become deeper toward the center of the vehicle. In addition, the arc-shaped grooves 41 are connected one to another. The depth of each of the arc-shaped grooves 41 is set at 40% to 80% of that of the main groove 2c. It is possible to enhance the rut performance because the arc-shaped grooves 41 are each designed to become deeper toward the center of the vehicle. In addition, it is possible to secure the aggregate area of the arc-shaped grooves 41, and thus to improve the wet performance, because the arc-shaped grooves 41 are connected one to another. On the other hand, the depth of each of the lateral grooves 42 open to the main groove 2d closer to the outside of the vehicle is set at 10% to 30% of that of the main groove 2d. When the depth of each of the lateral grooves 42 open to the main groove 2d closer to the outside of the vehicle is less than 10% of that of the main groove 2d, this depth decreases the rut performance. When the depth of each of the lateral grooves 42 exceeds 30% of that of the main groove 2d, this depth decreases the dry performance.

Out of the four land portions 20 to 50, the land portion 30 located second closest to the center of the vehicle includes, in an alternate manner, multiple lateral grooves 31 which cross the land portion 30, and multiple lateral grooves 32 which do not cross the land portion 30 with each of the lateral grooves 32 being open to the main groove 2b closer to the center of the vehicle. The lateral grooves 31 are each designed to become deeper toward the center of the vehicle. The depth of each of the lateral grooves 31 is set at 30% to 80% of that of the main groove 2b. The rut performance is enhanced because the lateral grooves 31 are each designed to become deeper toward the center of the vehicle.

Out of the four land portions 20 to 50, the width of the main groove 2c interposed between the land portion 30 and the land portion 40 is smaller than the widths of the other main grooves 2a, 2b, 2d and 2e. In addition, the width of the main groove 2c is set at less than 7 mm. In this respect, when the width of the main groove 2c is too large, the width decreases the rut performance and the dry performance.

As described above, the specifying of the groove arrangement and the groove shapes in the tread portion makes it possible to enhance the rut performance of the pneumatic tire for an SUV with the tire's dry and wet performances being reconciled with each other. It is desirable that the ratio of the footprint length to the footprint width in the tread portion 1 of such a pneumatic tire should be set at 0.4 to 0.6.

Figure 3:
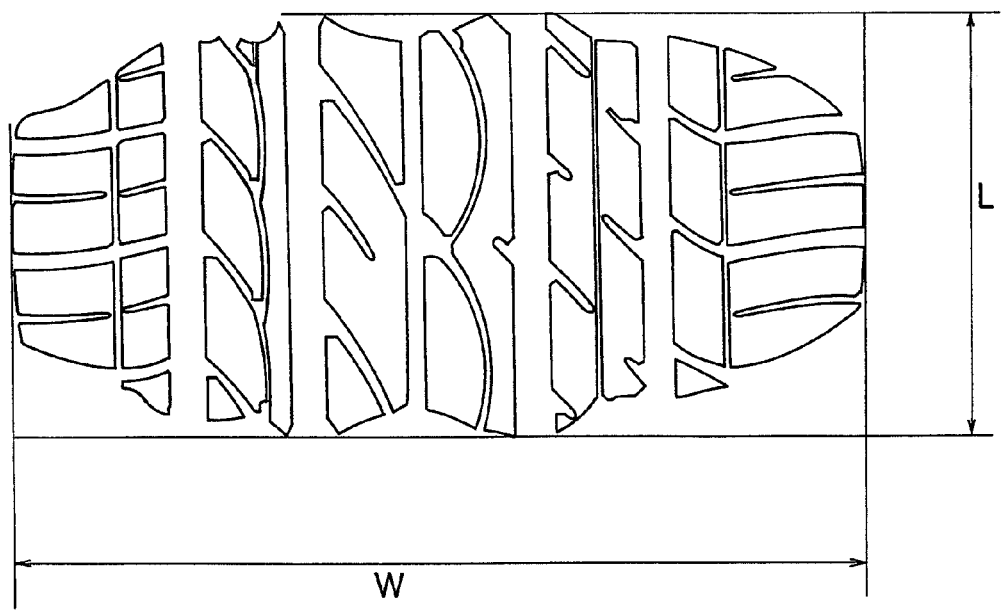
FIG. 3 is a plan view showing a footprint of the pneumatic tire according to the present invention.

FIG. 3 is a plan view showing a footprint of the pneumatic tire according to the present invention. The ratio (L/W) of the footprint length L to the footprint width W in the tread portion of the pneumatic tire as shown in FIG. 3 is set at 0.4 to 0.6. By decreasing the ratio (L/W), that is to say, by making the footprint area longer sideways, it is possible to inhibit the camber thrust, and thus to enhance the rut performance.

It should be understood that the preferred embodiment of the present invention which has been described in detail can be modified, substituted, or replaced in various manners without departing from the spirit or scope of the present invention which are defined by the accompanying scope of claims.

EXAMPLES

Tires for each of examples 1 to 7 were prepared on a basis of a pneumatic tire with a size of 295/40R20 and with an outside diameter of 750 mm which has a designated direction of sides thereof for mounting the tire on a vehicle. Each of the tires thus prepared was provided with five main grooves extending in the tire's circumferential direction in its tread portion, and was provided with 6 land portions which were defined by those main grooves. Each of the shoulder land portions was divided into a narrow rib portion with a width of 14 mm on a side closer to the main grooves and a block portion on a side closer to a corresponding one of the shoulders by a narrow groove which extended in the tire's circumferential direction, and which had a depth of 40% of that of its neighboring main groove. The four land portions interposed between the shoulder land portions were designed to have a width of 25 mm. A main groove in the center of the tread was designed to have a width of 6 mm and a depth of 8.2 mm. The other main grooves were each designed to have a width of 12 mm and a depth of 8.0 mm.

As shown in Table 1, the ratio of the depth of the lateral grooves 12 to the depth of their corresponding main groove (hereinafter referred to as a "groove depth ratio R12"), the ratio of the depth of the arc-shaped grooves 21 to the depth of their corresponding main groove (hereinafter referred to as a "groove depth ratio R21"), the ratio of the depth of the lateral grooves 31 to the depth of their corresponding main groove (hereinafter referred to as a "groove depth ratio R 31"), the ratio of the depth of the arc-shaped grooves 41 to the depth of their corresponding main groove (hereinafter referred to as a "groove depth ratio R41"), the ratio of the depth of the lateral grooves 42 to the depth of their corresponding main groove (hereinafter referred to as a "groove depth ratio R42"), the ratio of the depth of the lateral grooves 51 to the depth of their corresponding main groove (hereinafter referred to as a "groove depth ratio R51"), the ratio of the depth of the lateral grooves 52 to their corresponding main groove (hereinafter referred to as a "groove depth ratio R52"), the ratio of the depth of the lateral grooves 62 to the depth of their corresponding main groove (hereinafter referred to as a "groove depth ratio R62"), and the ratio of the footprint length to the footprint width in the tread portion (hereinafter referred to as a "footprint length ratio") were set up for each of examples 1 to 7.

For the comparison purpose, tires were prepared for comparative example 1. Each tire was provided with four main grooves extending in the tire's circumferential direction in its tread portion, and was provided with five land portions which were defined by those main grooves. Each of the shoulder land portions was made of blocks arranged in a row. The three land portions interposed between the shoulder land portions were 30 mm in width. In addition, the three land portions interposed between the shoulder land portions were each provided with multiple lateral grooves. The depth of the lateral grooves in each of the three land portions was set at 40% of that of their corresponding main groove.

The dry, wet and rut performances of the tires thus prepared were evaluated by use of the following evaluation method. The result of the evaluation is inclusively shown in Table 1.

Dry Performance:

The test tires were mounted on a four-wheel drive car with the test tires being mounted on wheels each having a rim size of 20×10 J. An air pressure of 240 kPa was applied to all of the test tires. Steering stabilities of the test tires on a dry road surface were evaluated in terms of feeling. The result of the evaluation was indicated in comparison with an index of 100 assigned to the tires prepared as comparative example 1. A larger index number means a better dry performance.

Wet Performance:

The test tires were mounted on a four-wheel drive car with the test tires being mounted on wheels each having a rim size of 20×10 J. An air pressure of 240 kPa was applied to all of the test tires. Steering stabilities of the tires on a wet road surface were evaluated in terms of feeling. The result of the evaluation was indicated in comparison with an index of 100 assigned to the tires prepared as comparative example 1. A larger index number means a better wet performance.

Rut Performance:

The test tires were mounted on a four-wheel drive car with the test tires being mounted on wheels each having a rim size of 20×10 J. An air pressure of 240 kPa was applied to all of the test tires. Steering abilities of the test tires on a road surface in which rusts were made were evaluated in terms of feeling. The result of the evaluation was indicated in comparison with an index of 100 assigned to the tires prepared as comparative example 1. A larger index number means a better rut performance, As clear from this table, all of the tires prepared for examples 1 to 7 exhibited a better dry, wet and rut performances.

Table 1

TABLE 1

| | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| NUMBER OF MAIN GROOVES | 4 | 5 | 5 | 5 | 5 | 5 | 5 | 5 |
| WIDTH OF LAND PORTION (mm) | 30 | 25 | 25 | 25 | 25 | 25 | 25 | 25 |
| WIDTH OF NARROW RIB PORTION (mm) | — | 14 | 14 | 14 | 14 | 14 | 14 | 14 |
| GROOVE DEPTH RATIO R12 (%) | — | 75 | 75 | 75 | 60 | 90 | 75 | 75 |
| GROOVE DEPTH RATIO R21 (%) | — | 75 | 60 | 90 | 75 | 75 | 75 | 75 |
| GROOVE DEPTH RATIO R31 (%) | — | 75 | 60 | 90 | 75 | 75 | 75 | 75 |
| GROOVE DEPTH RATIO R41 (%) | — | 75 | 60 | 90 | 75 | 75 | 75 | 75 |
| GROOVE DEPTH RATIO R42 (%) | — | 20 | 10 | 30 | 20 | 20 | 20 | 20 |
| GROOVE DEPTH RATIO R51 (%) | — | 75 | 60 | 90 | 75 | 75 | 75 | 75 |

TABLE 1-continued

| | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| GROOVE DEPTH RATIO R52 (%) | — | 20 | 10 | 30 | 20 | 20 | 20 | 20 |
| GROOVE DEPTH RATIO R62 (%) | — | 20 | 20 | 20 | 10 | 30 | 20 | 20 |
| FOOTPRINT LENGTH RATIO | 0.7 | 0.5 | 0.5 | 0.5 | 0.5 | 0.5 | 0.4 | 0.6 |
| DRY PERFORMANCE (INDEX) | 100 | 110 | 113 | 107 | 112 | 108 | 108 | 112 |
| WET PERFORMANCE (INDEX) | 100 | 110 | 107 | 113 | 108 | 112 | 108 | 112 |
| RUT PERFORMANCE (INDEX) | 100 | 110 | 107 | 113 | 108 | 112 | 112 | 108 |

What is claimed is:

1. A pneumatic tire with a nominal width of not less than 255 mm, an outside diameter of not less than 720 mm, and an aspect ratio of not more than 55%, and having a designated direction of sides thereof for mounting the tire on a vehicle, in its tread section, the pneumatic tire comprising:

five main grooves each extending in the tire's circumferential direction;

six land portions defined by the five main grooves, wherein each of shoulder land portions located at opposite outermost sides in the tire's width direction is divided into a narrow rib portion with a width of not less than 10 mm but not more than 15 mm on a side closer to its neighboring main groove and a block portion on a side closer to a corresponding outer edge of the tread section, by a narrow groove which extends in the tire's circumferential direction, and which has a depth of less than 50% of that of its neighboring main groove, wherein the remaining four land portions interposed between the shoulder land portions each have a width of not less than 20 mm but not more than 26 mm, wherein, out of the remaining four land portions, a land portion located closest to an outside of the vehicle includes a plurality of lateral grooves, at least one of said lateral grooves being open to any one of its two neighboring main grooves and at least another one of the lateral grooves being open to the other of the two neighboring main grooves, but not entirely crossing the land portion located closest to the outside of the vehicle, wherein some lateral grooves open to one of the two neighboring main grooves which is closer to a center of the vehicle has a depth of 60% to 90% of that of the main groove closer to the center of the vehicle, and wherein the other lateral grooves open to the other of the two neighboring main grooves which is closer to the outside of the vehicle has a depth of 10% to 30% of that of the main groove closer to the outside of the vehicle.

2. The pneumatic tire as recited in claim 1, wherein, out of the remaining four land portions, a land portion located closest to a center of the vehicle includes a plurality of arc-shaped grooves each extending in an arc shape to open to the neighboring main groove which is closer to the center of the vehicle but not crossing the land portion located closest to the center of the vehicle, wherein the arc-shaped grooves each become deeper toward the center of the vehicle, and wherein the arc-shaped grooves are arranged in order that the arc-shaped grooves should be connected one to another.

3. The pneumatic tire as recited in claim 1, wherein, out of the remaining four land portions, a land portion located second closest to the outside of the vehicle includes a plurality of arc-shaped grooves each extending in an arc shape to open to the neighboring main groove which is closer to a center of the vehicle but not crossing the land portion second closest to the outside of the vehicle, and a plurality of lateral grooves being open to the neighboring main groove which is closer to the outside of the vehicle but not crossing the land portion second closest to the outside of the vehicle, wherein the arc-shaped grooves each become deeper toward the center of the vehicle, and are arranged in order that the arc-shaped grooves should be connected one to another, and wherein each of the lateral grooves open to the main groove that is closer to the outside of the vehicle has a depth of 10% to 30% of that of the main groove closer to the outside of the vehicle.

4. The pneumatic tire as recited in claim 1, wherein, out of the remaining four land portions, a land portion located second closest to a center of the vehicle includes a plurality of lateral grooves which cross the land portion, and wherein the lateral grooves which cross the land portion each become deeper toward the center of the vehicle.

5. The pneumatic tire as recited in claim 1, wherein, out of the remaining four land portions, a land portion located closest to the center of the vehicle includes a plurality of arc-shaped grooves each extending in an arc shape to open to the neighboring main groove which is closer to the center of the vehicle but not crossing the land portion located closest to the center of the vehicle, the arc-shaped grooves becoming deeper toward the center of the vehicle, and the arc-shaped grooves being arranged in order that the arc-shaped grooves should be connected one to another, wherein, out of the remaining four land portions, a land portion located second closest to the outside of the vehicle includes a plurality of arc-shaped grooves each extending in an arc shape to open to the neighboring main groove which is closer to the center of the vehicle but not crossing the land portion located second closest to the outside of the vehicle and a plurality of lateral grooves being open to the neighboring main groove portion which is closer to the outside of the vehicle but not crossing the land portion second closest to the outside of the vehicle, the arc-shaped grooves each becoming deeper toward the center of the vehicle, the arc-shaped grooves being arranged in order that the arc-shaped grooves should be connected one to another, and the lateral grooves open to the main groove that is closer to the outside of the vehicle each having a depth of 10% to 30% of that of the main groove closer to the outside of the vehicle, and wherein, out of the remaining four land portions, a land portion located second closest to the center of the vehicle includes a plurality of lateral grooves which cross the land portion, the lateral grooves which cross the land portion becoming deeper toward the center of the vehicle.

6. The pneumatic tire as recited in any one of claims 1 and 2 to 5, wherein a main groove interposed between the land portion second closest to the outside of the vehicle and the land portion second closest to the center of the vehicle out of the remaining four land portions is narrower than the rest of the main grooves, and is less than 7 mm in width.

7. The pneumatic tire as recited in any one of claims 1 and 2 to 5, wherein the narrow rib portion in the shoulder land portion which is closer to the outside of the vehicle includes a plurality of lateral grooves that cross the narrow rib portion, and the lateral grooves each have a depth of 10% to 30% of that of the main groove.

8. The pneumatic tire as recited in any one of claims 1 and 2 to 5, wherein the narrow rib portion in the shoulder land portion which is closer to the center of the vehicle includes, in an alternate manner, a plurality of lateral grooves being open to any one of its two neighboring main grooves but not crossing the narrow rib portion, and the lateral grooves which cross the narrow rib portion each have a depth of 60% to 90% of that of the main groove.

9. The pneumatic tire as recited in any one of claims 1 and 2 to 5, wherein the ratio of the footprint length to the footprint width of the tread portion is set at 0.4 to 0.6.

* * * * *